US012809373B2

(12) United States Patent
Cuan et al.

(10) Patent No.: US 12,809,373 B2
(45) Date of Patent: Nov. 24, 2026

(54) ROBOT NAVIGATION IN DEPENDENCE ON GESTURE(S) OF HUMAN(S) IN ENVIRONMENT WITH ROBOT

(71) Applicant: GDM Holding LLC, Mountain View, CA (US)

(72) Inventors: Catie Cuan, Stanford, CA (US); Tsang-Wei Lee, Mountain View, CA (US); Anthony G. Francis, Jr., Simpsonville, SC (US); Alexander Toshev, San Francisco, CA (US); Soeren Pirk, Palo Alto, CA (US)

(73) Assignee: GDM Holding LLC, Mountain View, CA (US)

( * ) Notice: Subject to any disclaimer, the term of this patent is extended or adjusted under 35 U.S.C. 154(b) by 132 days.

(21) Appl. No.: 18/240,124

(22) Filed: Aug. 30, 2023

(65) Prior Publication Data

US 2024/0094736 A1 Mar. 21, 2024

Related U.S. Application Data

(60) Provisional application No. 63/407,429, filed on Sep. 16, 2022.

(51) Int. Cl.
*G05D 1/00* (2024.01)
*G06V 10/80* (2022.01)
(Continued)

(52) U.S. Cl.
CPC ......... *G05D 1/0221* (2013.01); *G05D 1/0248* (2013.01); *G05D 1/0274* (2013.01);
(Continued)

(58) Field of Classification Search
CPC .. G05D 1/0221; G05D 1/2464; G05D 1/0248; G05D 1/0247; G06V 40/28; G06V 10/82; G06V 10/80
See application file for complete search history.

(56) References Cited

U.S. PATENT DOCUMENTS

2020/0349728 A1* 11/2020 Bitan ..................... G06T 7/521
2021/0064122 A1* 3/2021 Fujinawa ............. G06T 19/006
(Continued)

FOREIGN PATENT DOCUMENTS

WO WO-2019028075 A1 * 2/2019 ........... B25J 13/006

*Primary Examiner* — Wade Miles
(74) *Attorney, Agent, or Firm* — Gray Ice Higdon

(57) ABSTRACT

Training and/or utilizing a high-level neural network (NN) model, such as a sequential NN model. The high-level NN model, when trained, can be used to process a sequence of consecutive state data instances (e.g., N most recent, including a current state date instance) to generate a sequence of outputs that indicate a sequence of position deltas. The sequence of position deltas can be used to generate an intermediate target position for navigation and, optionally, an intermediate target orientation that corresponds to the intermediate target position. The intermediate target position and, optionally, the intermediate target orientation, can be provided to a low-level navigation policy, such as an MPC policy, and used by the low-level navigation policy as its goal position (and optionally goal orientation) for a plurality of iterations (e.g., until a new intermediate target position (and optionally new target orientation) is generated using the high-level NN model.

19 Claims, 6 Drawing Sheets

(51) Int. Cl.
*G06V 10/82* (2022.01)
*G06V 40/20* (2022.01)

(52) U.S. Cl.
CPC .............. *G06V 10/80* (2022.01); *G06V 10/82* (2022.01); *G06V 40/28* (2022.01)

(56) References Cited

U.S. PATENT DOCUMENTS

| | | | | | |
|---|---|---|---|---|---|
| 2021/0311469 | A1* | 10/2021 | Zhang | ..................... | G06F 18/24 |
| 2022/0314444 | A1* | 10/2022 | Hajash | ................... | B25J 9/1664 |
| 2022/0331964 | A1* | 10/2022 | Spector | .................. | B25J 13/084 |
| 2023/0001587 | A1* | 1/2023 | Zak | .......................... | B25J 19/06 |
| 2023/0050825 | A1* | 2/2023 | Plikynas | ................ | G06V 20/20 |
| 2023/0363610 | A1* | 11/2023 | Zhang | ....................... | G06T 7/11 |
| 2024/0061401 | A1* | 2/2024 | Gradoussoff | .......... | B25J 9/1656 |
| 2024/0175702 | A1* | 5/2024 | Yang | .................. | G01C 21/3446 |

* cited by examiner

ROBOT NAVIGATION IN DEPENDENCE ON GESTURE(S) OF HUMAN(S) IN ENVIRONMENT WITH ROBOT

BACKGROUND

Robot navigation is one of the fundamental challenges in robotics. To operate effectively, various mobile robots require robust navigation in dynamic environments. Robot navigation is often defined as finding a path from a start position to a goal position (and optionally goal orientation), and executing the path in a robust and safe manner. Typically, robot navigation requires a robot to perceive its environment, localize itself with respect to a target, reason about obstacles in its immediate vicinity, and also reason about a long-range path to the overall goal position.

Various existing low-level navigation policies, such as model predictive control (MPC) policies, can efficiently and robustly perform complex navigation tasks with remarkable success. Such low-level navigation policies can, for example, navigate to a goal position by iteratively producing low-level command(s) (e.g., torque(s) for actuator(s) that control wheel(s), leg(s), blade(s), and/or other navigational component(s) of a robot) in dependence on the goal position and corresponding occupancy maps. Such corresponding occupancy maps can be generated based on (e.g., solely based on) point cloud data obtained from, for example, light detection and ranging (LiDAR) scanners that provide real-time information about the environment, including dynamic objects such as humans. For example, such corresponding occupancy maps can each be a two-dimensional projection of a corresponding instance of point cloud data.

While such low-level navigation policies enable a mobile robot to efficiently and robustly navigate in an environment, while avoiding obstacles, they are not reactive to various behaviors of humans or other dynamic object(s) in the environment. For example, the point cloud data and/or occupancy maps can fail to capture navigational gesture(s), facial expression(s), and/or other navigational cue(s) expressed by human(s) in the environment. For instance, they can fail to capture a "pointing left" gesture from a human that indicates the human would like the robot to navigate to the left of the human. Further, such low-level navigation policies can, at each iteration, process a current instance of point cloud data and/or an occupancy map, which can fail to recognize cue(s) (e.g., gesture(s)) that occur over multiple time steps.

SUMMARY

Implementations disclosed herein are directed to training and/or utilizing a high-level neural network (NN) model, such as a sequential NN model. The high-level NN model, when trained, can be used to process a sequence of consecutive state data instances (e.g., N most recent, including a current state date instance) to generate a sequence of outputs that indicate a sequence of position deltas. The sequence of state data instances can include a sequence of images (e.g., color images from a camera of a mobile robot) and, optionally, a sequence of consecutive normalized position data instances and/or a sequence of consecutive occupancy maps. The sequence of position deltas, indicated by the sequence of outputs, can be used to generate an intermediate target position for navigation and, optionally, an intermediate target orientation that corresponds to the intermediate target position. The intermediate target position and, optionally, the intermediate target orientation, can be provided to a low-level navigation policy, such as an MPC policy, and used by the low-level navigation policy as its goal position (and optionally goal orientation) for a plurality of iterations (e.g., until a new intermediate target position (and optionally new target orientation) is generated using the high-level NN model.

Many low-level navigation policies typically operate independent of color images (and optionally independent of any data derived from color image(s)) and/or operate, at each iteration, without considering state data instance(s) from past iteration(s). However, providing, for use by the low-level navigation policy as its goal position, the intermediate target position for navigation and, optionally, the intermediate target orientation—which can be generated based at least on a sequence of consecutive color images—enables the low-level navigation policy to be influenced by color images and state data instance(s) from past iterations. This can enable, for example, improved navigation and/or navigation that is reactive to gesture(s) and/or other cue(s) from dynamic object(s) in an environment with a mobile robot. Notably, this can be enabled without necessitating altering of the low-level navigation policy and/or without having the low-level navigation policy need to directly process color images and/or state data instance(s) from past iterations. In these and other manners, navigation of a mobile robot can obtain the benefits of the low-level navigation policy (e.g., safe and robust navigation), while also obtaining the benefits of the high-level NN model (e.g., navigation that is responsive to cue(s) of dynamic environmental object(s)).

In various implementations the high-level NN model is used iteratively during a navigation episode to generate a corresponding updated intermediate target position (and optionally updated intermediate orientation) at each iteration, which can then be provided for use by the low-level navigation policy as an updated goal position (and optionally goal orientation) for multiple iterations of the low-level navigation policy. In some implementations, iterative utilization of the high-level NN model is at a lesser frequency than a frequency at which the low-level navigation policy operates. In some of those implementations, the relative frequency between the two can strike a balance that enables high-level NN model influence on the low-level navigation policy, without overly constraining the low-level navigation policy.

In various implementations the high-level NN model can be trained based on a plurality of imitation learning episodes. During each of the imitation learning episodes a corresponding human operator can control a corresponding mobile robot (e.g., using teleoperation techniques) to react in accordance with corresponding dynamic environmental condition(s) observed via corresponding color images generated by a camera of the corresponding robot. For example, corresponding human operators can be instructed to control corresponding mobile robots in dependence on corresponding gesture(s) of human(s). For instance, to navigate the mobile robot to the right in response to a first gesture, to the left in response to a second gesture, and/or in a circle in response to a third gesture. Training based on the imitation learning episodes results in inference-time processing, using the high-level NN model, that generates sequences of position deltas and corresponding intermediate target positions that are influenced by the demonstrations of the imitation learning episodes. Accordingly, the inference time processing can enable generation of intermediate target positions that, when provided to and utilized by a low-level navigation policy, results in navigation that is responsive to observed color images. For example, navigation that is responsive to human gesture(s) captured by the observed color images.

The above description is provided as an overview of only some implementations disclosed herein. These and other implementations are described in more detail herein.

Other implementations can include at least one transitory or non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
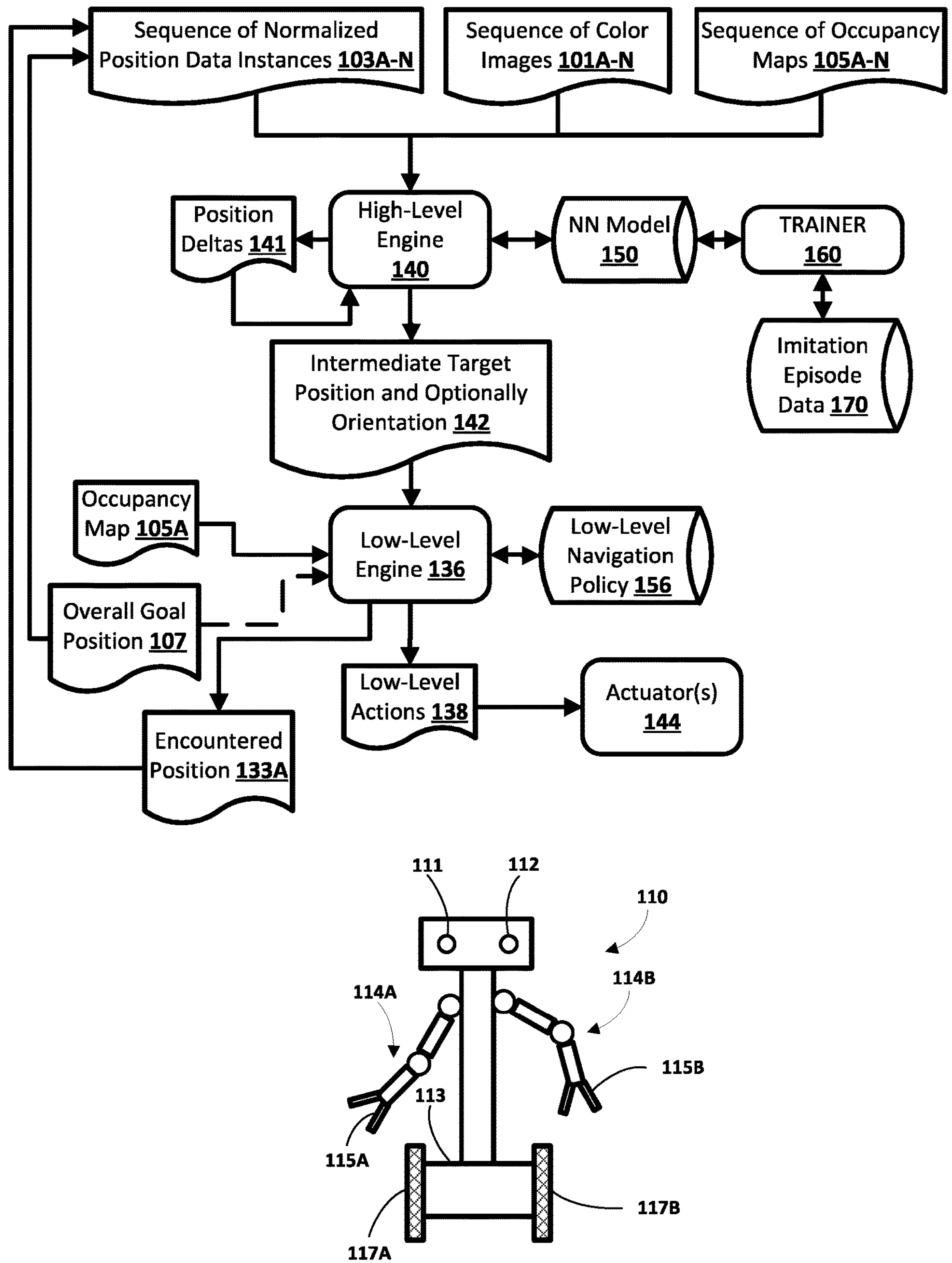
FIG. 1 illustrates an example environment in which implementations disclosed herein can be implemented.

Turning now to the Figures, FIG. 1 illustrates an example environment in which implementations disclosed herein can be implemented.

FIG. 1 includes a low-level engine 136 that utilizes a low-level navigation policy 156 in generating low-level actions 138 that can be provided to actuator(s) of a mobile robot, such as those that control locomotion of the mobile robot, in navigating the robot to an overall goal position and, optionally, overall goal orientation. In generating the low-level actions 138, the low-level navigation engine 138 can apply, to the low-level navigation policy 156, a current occupancy map 105A. The low-level navigation engine 138 can also apply, to the low-level navigation policy 156, an intermediate target position and, optionally intermediate orientation 142, generated by a high-level engine 140 and, optionally an overall goal position 107 (e.g., in initial iteration(s)). Although only a single iteration of generating low-level actions 138 is illustrated in FIG. 1, the low-level engine 136 will generate additional corresponding low-level actions in other iterations during a navigation episode, as described herein.

The high-level engine 140 can utilize a trained high-level NN model 150 to process a consecutive sequence of normalized position data instances 103A-N, a consecutive sequence of color images 101A-N, and/or a consecutive sequence of occupancy maps 105A-N, to generate a sequence of position deltas 141. The high-level engine 140 can use the sequence of position deltas 141 in generating intermediate target position and, optionally intermediate orientation 142. Although only a single iteration of generating a sequence of position deltas 141 and generating intermediate target position and, optionally intermediate orientation 142 is illustrated in FIG. 1, the high-level engine 140 will generate additional sequences of position deltas and intermediate target positions (and optionally intermediate orientations) in other iterations during a navigation episode, as described herein.

The high-level NN model 150 can be trained by a trainer 160, which can utilize imitation episode data 170 in the training.

The consecutive sequence of normalized position data instances 103A-N can be generated based on a current encountered position 133A provided by low-level engine 136, immediately preceding encountered positions provided by the low-level engine 136, and the overall goal position 107. For example, a normalized position data instance 103A can be the difference between the encountered position 133A and the overall goal position 107. The consecutive sequence of color images 101A-N can be generated by a camera of a mobile robot. The consecutive sequence of occupancy maps 105A-N can include the current occupancy map 105A utilized by the low-level engine 136, as well as immediately preceding occupancy maps utilized by the low-level engine 136.

Robot 110 is also illustrated in FIG. 1, and is one example of a mobile robot that can utilize both the high-level engine 140 and the low-level engine 136 in a navigation episode according to implementations disclosed herein. Additional and/or alternative robots may be provided, such as additional robots that vary in one or more respects from robot 110 illustrated in FIG. 1. For example, a mobile forklift robot, an unmanned aerial vehicle ("UAV"), and/or a humanoid robot may be utilized instead of or in addition to robot 110.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision component 111 that can generate observation data related to shape, color, depth, and/or other features of object(s) that are in the line of sight of the vision component 111. The vision component 111 can be, for example, a monocular camera or a stereographic camera that generates color images (i.e., images that include one or more color channels, such as RGB images). The robot 110 also includes an additional vision component 112 that can generate observation data related to depth and/or other features of object(s) that are in the line of sight of the vision component 112. The vision component 112 can be, for example, a proximity sensor, a two-dimensional (2D) LiDAR component or a three-dimensional (3D) LIDAR component.

Robot 110 also includes one or more processors that, for example: implement the high-level engine 140 and the low-level engine 136 (described below) and provide control commands to actuators of the robot 110 based on low-level actions generated utilizing the low-level navigation policy 156, which can be influenced by values generated using the high-level NN model 150 as described herein. The robot 110 also includes robot arms 114A and 114B with corresponding end effectors 115A and 115B that each take the form of a gripper with two opposing "fingers" or "digits." Although particular grasping end effectors 115A, 115B are illustrated, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Further, some robots may lack any end effector and/or lack any arm. Additionally, although particular placements of vision components 111 and 112 are illustrated in FIG. 1, additional and/or alternative placements may be utilized.

Figure 2:
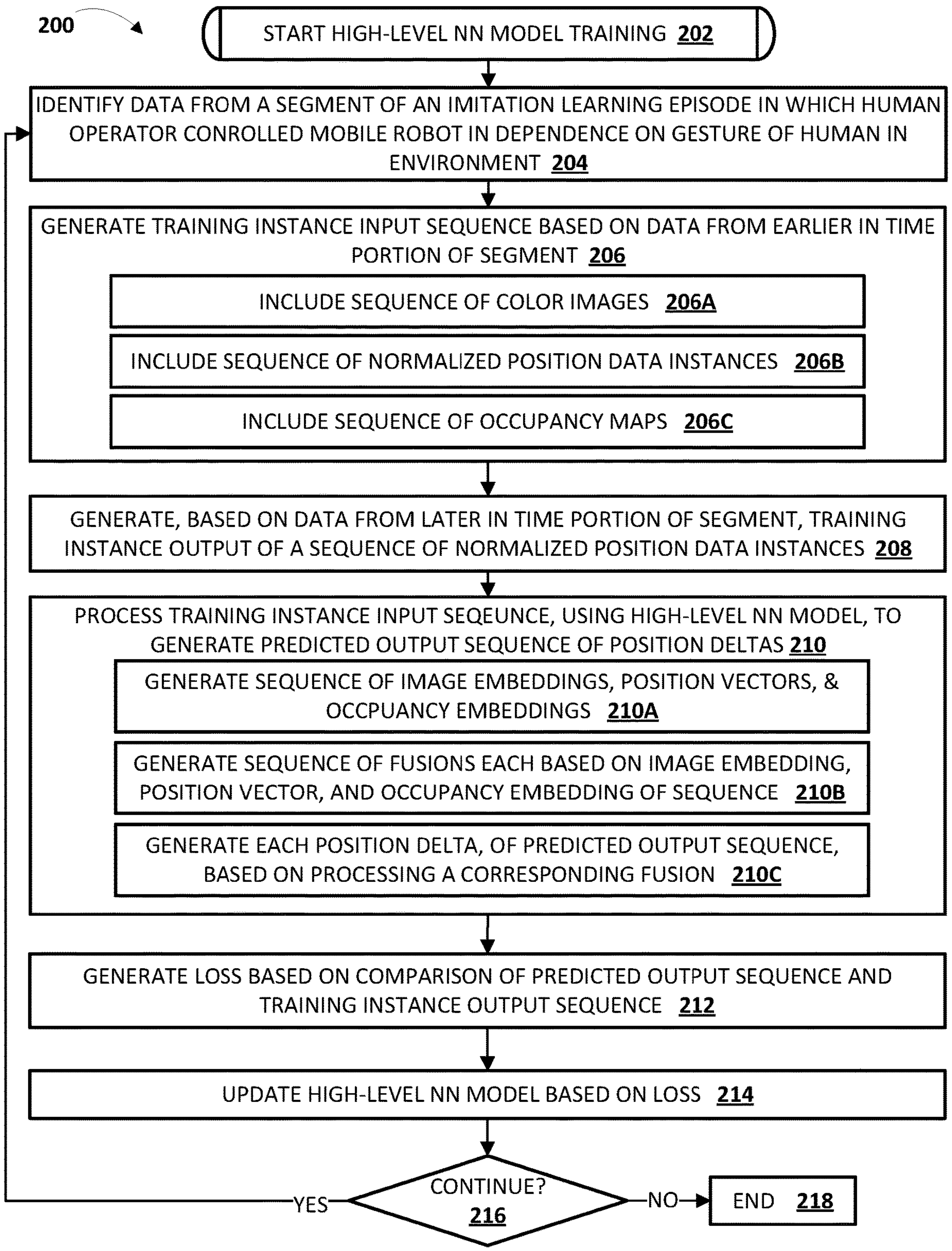
FIG. 2 is a flowchart illustrating an example method of training a high-level neural network model according to various implementations disclosed herein.

Turning now to FIG. 2, a flowchart is provided illustrating an example method 200 of training a high-level neural network model according to various implementations disclosed herein. For convenience, the operations of the flow chart are described with reference to a system that performs the operations. This system may include one or more components of one or more computer systems, such as one or more processors of one or more computing devices. Moreover, while operations of method 200 are shown in a particular order, this is not meant to be limiting. One or more operations may be reordered, omitted or added.

At block 202, the system starts high-level NN model training.

At block 204, the system identifies data from a segment of an imitation learning episode in which a human operator controlled a mobile robot in dependence on a gesture of a human in the environment with the mobile robot (and captured in image(s) generated by a camera of the mobile robot). For example, the imitation learning episode can be one where a sequence of 500 consecutive state data instances were generated and the system can identify a segment of 20 consecutive state data instances (e.g., first 20, middle 20, or other segment).

At block 206, the system generates a training instance input sequence based on the data from an earlier in time portion of the segment. For example, the system can generate the training instance input sequence based on the first 10 consecutive state data instances of the segment. At block 206, the system can optionally perform one or more of sub-blocks 206A-C.

At sub-block 206A, the system includes, in the training instance input sequence, a sequence of color images from the data and from the earlier in time portion of the segment. The color images can be, for example, images that include a red channel, a blue channel, and a green channel (RGB images). Optionally, the images can also include a depth channel.

At sub-block 206B, the system includes, in the training instance input sequence, a sequence of normalized position data instances from the data and from the earlier in time portion of the segment. In some implementations, a normalized position data instance can be generated as the difference between (a) a current position of the mobile robot at a corresponding point in time and (b) an overall goal position for the imitation learning episode. In other words, it can reflect the current position of the mobile robot relative to the overall goal position.

At sub-block 206C, the system includes, in the training instance input sequence, a sequence of occupancy maps from the data and from the earlier in time portion of the segment.

At block 208, the system generates, based on data from a later in time portion of the segment, training instance output of a sequence of normalized position data instances. For example, the system can generate the training instance output sequence based on normalized data instances determined from the next 10 (or other quantity) consecutive state data instances of the segment that immediately follow the state data instances utilized in generating the training instance input sequence at block 206.

At block 210, the system processing the training instance input sequence, using the high-level NN model, to generate a predicted output sequence of position deltas. At block 210, the system can optionally perform one or more of sub-blocks 210A-C.

At sub-block 210A the system generates a sequence of image embeddings, position vectors, and occupancy embeddings. For example, in a first iteration the system generates: a first image embedding by processing the first color image of the training instance input sequence using an image processing tower of the high-level NN model, a first position vector by processing the first normalized position data instance of the training instance input sequence using a position processing tower of the high-level NN model, and a first occupancy embedding by processing the first occupancy map of the training instance input sequence using an occupancy processing tower of the high-level NN model. Further, in a second iteration the system generates: a second image embedding by processing the second color image of the training instance input sequence using the image processing tower, a second position vector by processing the second normalized position data instance of the training instance input sequence using the position processing tower, and a second occupancy embedding by processing the second occupancy map of the training instance input sequence using the occupancy processing tower of the high-level NN model. This can occur for each of the state data instances of the training instance input sequence.

At sub-block 210B, the system generates a sequence of fusions that are each based on one of the image embeddings of sub-block 210A, one of the position vectors of sub-block 210A, and one of the occupancy embeddings of sub-block 210A. For example, the system can generate: a first fusion by concatenating a first image embedding, a first position vector, and a first occupancy embedding; a second fusion by concatenating a second image embedding, a second position vector, and a second occupancy embedding; etc.

At sub-block 210C, the system generates each position delta, of the predicted output sequence, based on processing a corresponding fusion generated at sub-block 210B. For example, the system can generate: a first position delta by processing the first fusion using fusion layer(s) of the high-level NN model; a second position delta by processing the second fusion using fusion layer(s) of the high-level NN model; etc.

At block 212, the system generates a loss based on comparison of the predicted output sequence, of block 210, to the training instance output sequence, of block 208. For example, the system can generate the loss as a function of the Squared Error loss (L2 loss) between the predicted output sequence and the training instance output sequence.

At block 214, the system updates the high-level NN model based on the loss. For example, the system can utilize backpropagation of the loss to update weights of the high-level NN model.

At block 216, the system determines whether to continue training of the high-level NN model. If so, the system proceeds back to block 204 and identifies another segment, from the same imitation learning episode or from an additional imitation learning episode. If not, the system proceeds to block 218 and training of the high-level NN model ends. At block 216, the system can make the determination based on whether unprocessed unique segments of imitation learning episodes remain and/or if other training criterion or criteria have been met (e.g., a threshold duration or epochs of training).

Although FIG. 2 illustrates training based on a training instance immediately following generating of the training instance, it is understood that in various implementations a batch of training instances can be generated and then utilized in training. Also, although FIG. 2 illustrates, at block 214, updating the high-level NN model based on a loss, it is understood that in various implementations a batch of losses can additionally or alternatively be generated and utilized in updating the high-level NN model.

Figure 3:
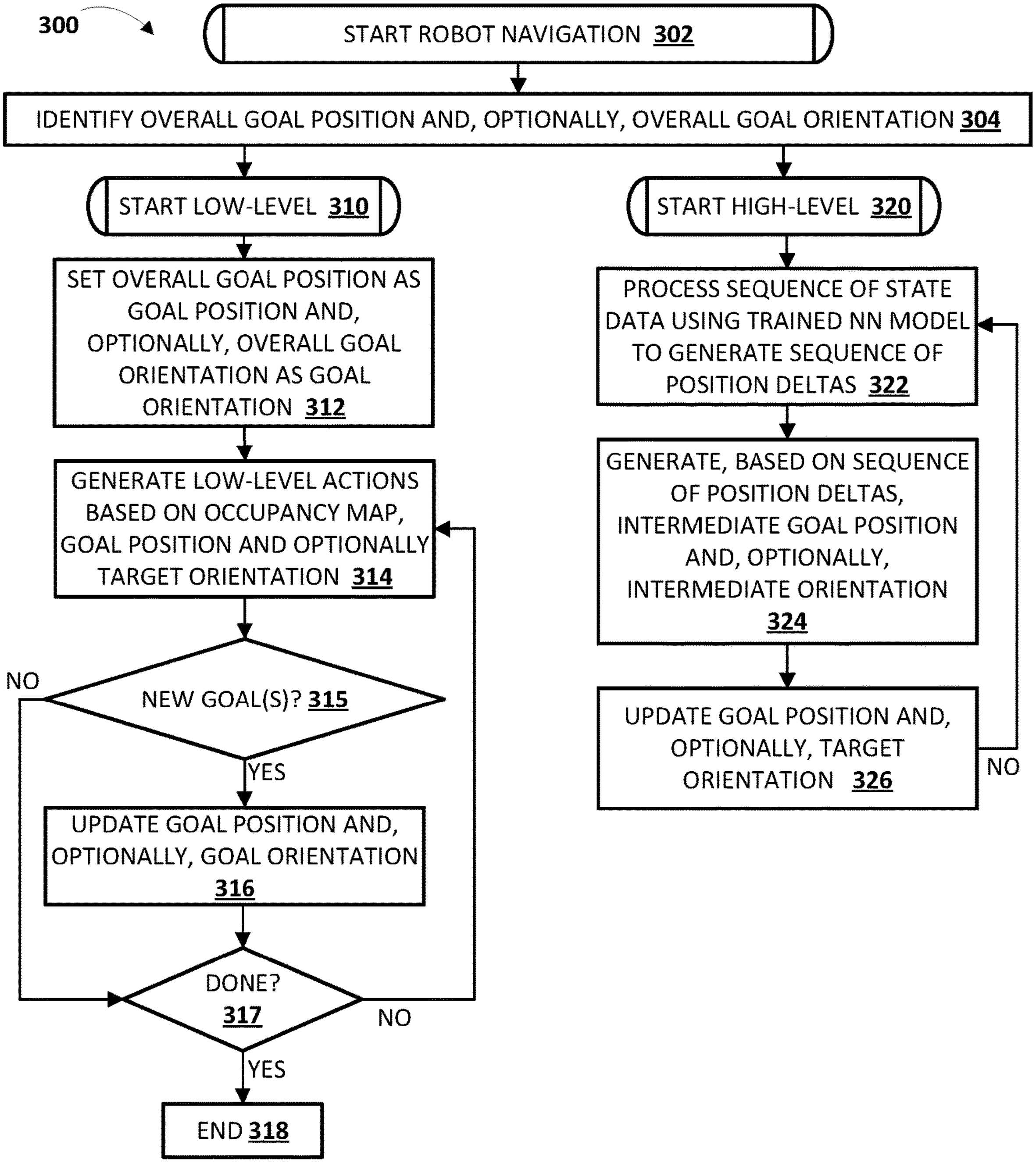
FIG. 3 is a flowchart illustrating an example method of robot navigation utilizing both a low-level navigation policy and a trained high-level neural network model.

Turning now to FIG. 3, a flowchart is provided illustrating an example method 300 of robot navigation utilizing both a low-level navigation policy and a trained high-level neural network model according to various implementations disclosed herein. For convenience, the operations of the flow chart are described with reference to a system that performs the operations. This system may include one or more components of one or more computer systems, such as one or more processors of a mobile robot. Moreover, while operations of method 300 are shown in a particular order, this is not meant to be limiting. One or more operations may be reordered, omitted or added.

At block 302, the system starts robot navigation.

At block 304, the system identifies an overall goal position (e.g., X, Y, and optionally Z coordinate) and, optionally, an overall goal orientation (e.g., roll, pitch, and/or yaw). The overall goal position and/or overall goal orientation can be, for example, provided by a human or provided by a higher-level task planner of the robot (e.g., the task planner can determine a need to navigate to position X to perform a task).

At block 310, low-level navigation, based on a low-level navigation policy, begins. Such low-level navigation can include blocks 312, 314, 316, 318, and/or 319.

At block 312, the system sets the overall goal position of block 304 as a goal position and, optionally, sets the overall goal orientation of block 304 as the goal orientation. In some implementations, block 312 is omitted and the initial goal position and/or goal orientation can be set by a first iteration of high-level policy influence of the low-level navigation (described below and elsewhere herein).

At block 314, the system generates low-level actions based on a current occupancy map, a goal position, and, optionally, a goal orientation. The system can further cause implementations of those low-level actions by corresponding actuators of the mobile robot.

At block 315, the system determines if there is a new goal position and/or orientation. For example, there could be a new goal position and/or orientation provided by block 328 (described below) of high-level policy influence of the low-level navigation—or there could be a new goal position and/or orientation provided by human input and/or a higher-level task planner. If, at block 315, the system determines there is not a new goal position and/or orientation, the system proceeds to block 317.

If, at block 315, the system determines there is a new goal position and/or orientation, the system proceeds to block 316. At block 316, the system updates the goal position and/or goal orientation to reflect the new goal position and/or orientation determined at block 315 (e.g., to reflect one provided by block 328 (described below) of high-level policy influence of the low-level navigation).

At block 317, the system determines whether robot navigation is complete. If so, the system proceeds to block 318 and the current episode of robot navigation ends. If not, the system proceeds back to block 314. The system can determine robot navigation is complete when, for example, an overall goal position and/or overall goal orientation has been reached.

At block 320, the system starts high-level policy influence of the low-level navigation. High-level policy influence of the low-level navigation is performed in parallel with low-level navigation based on the low-level navigation policy. In various implementations, low-level navigation based on the low-level navigation policy is performed at a higher frequency than is high-level policy influence of the low-level navigation.

At block 322, the system processes a sequence of consecutive state data, using a trained NN model (e.g., a high-level NN model trained based on method 200 of FIG. 2), to generate a sequence of position deltas.

At block 324, the system generates, based on the sequence of position deltas of block 322, an intermediate goal position and, optionally, an intermediate orientation. For example, the system can generate the intermediate goal position to be (a) a current position of the robot (e.g., as provided by the low-level navigation policy) plus (b) a sum of the sequence of position deltas. Also, for example, the system can generate the intermediate orientation based on a trajectory of at least a subset of the sequence of position deltas. For instance, the system can generate the intermediate orientation to be in a direction that conforms to at least the last two position deltas of the sequence. In these and other manners, when the intermediate orientation is provided to the low-level navigation policy, it can influence (but not overly constrain) the low-level navigation policy to follow the trajectory of the sequence of position deltas. This can be due to the low-level navigation policy attempting to achieve its goal orientation through path planning to the goal position as opposed to adjustment after arriving at the goal position (e.g., due to path planning adoption being more efficient and/or more robust).

At block 326, the system causes the low-level navigation policy to update its goal position and, optionally, target orientation, to reflect the intermediate goal position and optionally intermediate orientation generated at block 324. The system then proceeds back to block 322, optionally after a delay that can be based on a desired frequency variation between high-level policy influence of the low-level navigation and the low-level navigation. The system can terminate high-level policy influence of the low-level navigation when, for example, the system performs block 318 (described above).

Figure 4:
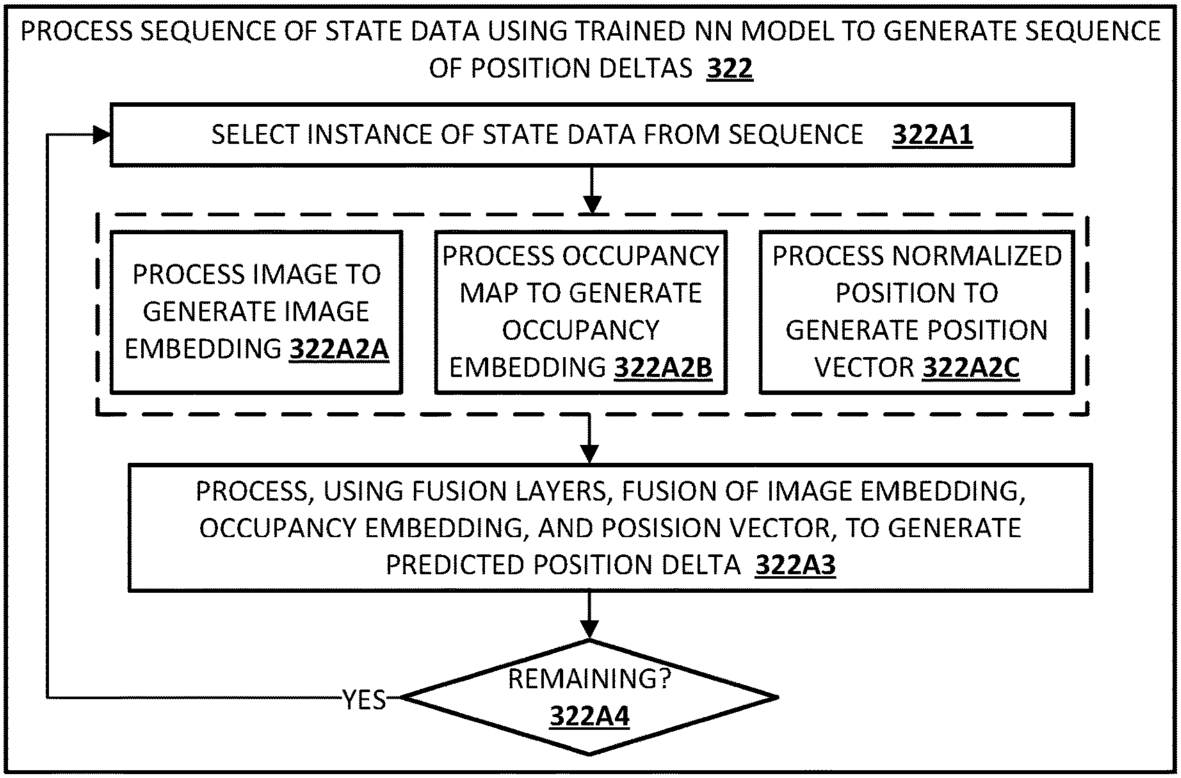
FIG. 4 is a flowchart illustrating an example of implementations of block 322 of the example method illustrated by FIG. 3.

Turning now to FIG. 4, a flowchart is illustrated of an example of implementations of block 322 of the example method illustrated by FIG. 3.

At block 322A1, the system selects an instance of state data from the sequence. For example, the sequence can include the most recent consecutive N state data instances and the system can select the least recent in time of those in the initial iteration of block 322A1, then a second least, etc. Each state data instance can include a corresponding image that includes color channel(s) and a corresponding occupancy map and/or a corresponding normalized mobile robot position.

At block 322A2A, the system processes (e.g., using an image tower of the trained NN model) the image of the selected instance to generate an image embedding.

At block 322A2B, the system processes (e.g., using an occupancy tower of the trained NN model) the occupancy map of the selected instance to generate an occupancy embedding.

At block 322A2C, the system processes (e.g., using a position tower of the trained NN model) the normalized position of the selected instance to generate a position vector.

Blocks 322A2A, 322A2B, and 322A2C can be performed in parallel.

At block 322A2 the system processes, using fusion layers of the trained NN model, a fusion of: the image embedding (generated at a most recent iteration of block 322A2A), the occupancy embedding (generated at a most recent iteration of block 322A2B), and the position vector (generated at a most recent iteration of block 322A2C), to generate a predicted position delta.

At block 322A4, the system determines whether there are any remaining unprocessed instances of state data from the sequence. If so, the system proceeds back to block 322A1 and selects a next instance of the sequence. If not, generating the sequence of position deltas is complete, and the system proceeds to block 324 (FIG. 3).

Figure 5:
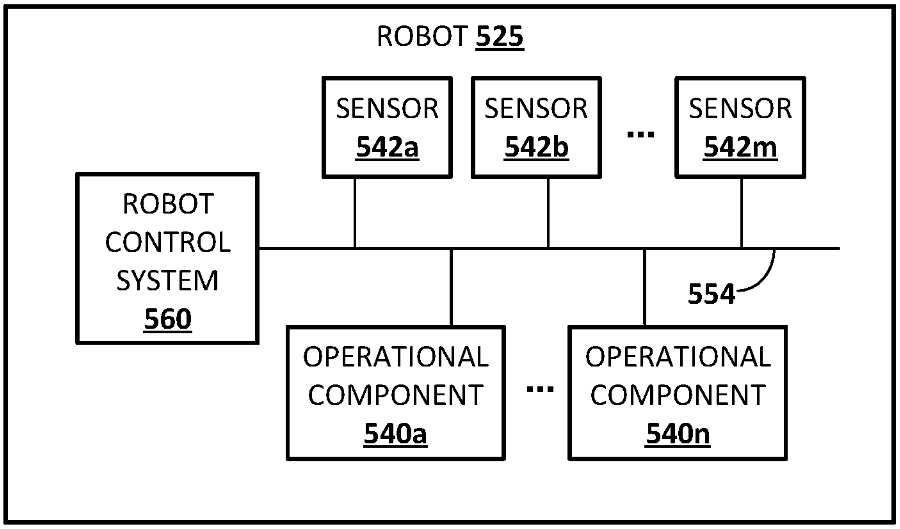
FIG. 5 schematically depicts an example architecture of a robot.

FIG. 5 schematically depicts an example architecture of a robot 525. The robot 525 includes a robot control system 560, one or more operational components **540*a*-540*n*, and one or more sensors 542*a*-542*m*. The sensors 542*a*-542*m* may include, for example, vision sensors, light sensors, pressure sensors, pressure wave sensors (e.g., microphones), proximity sensors, accelerometers, gyroscopes, thermometers, barometers, and so forth. While sensors 542*a*-542*m* are depicted as being integral with robot 525, this is not meant to be limiting. In some implementations, sensors 542*a*-542*m* may be located external to robot 525**, e.g., as standalone units.

Operational components **540*a*-540*n* may include, for example, one or more end effectors and/or one or more servo motors or other actuators to effectuate movement of one or more components of the robot. For example, the robot 525 may have multiple degrees of freedom and each of the actuators may control actuation of the robot 525** within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 560 may be implemented in one or more processors, such as a CPU, GPU, and/or other controller(s) of the robot 525. In some implementations, the robot 525 may comprise a "brain box" that may include all or aspects of the control system 560. For example, the brain box may provide real time bursts of data to the operational components **540*a*-540*n*, with each of the real time bursts comprising a set of one or more control commands that dictate, inter alia, the parameters of motion (if any) for each of one or more of the operational components 540*a*-540*n*. In some implementations, the robot control system 560 may perform one or more aspects of method 300** and/or other methods described herein.

As described herein, in some implementations all or aspects of the control commands generated by control system 560 in performing a robotic task can be based on utilization of a low-level navigation policy that is at least selectively influenced through utilization of values generated using a high-level NN model as described herein. Although control system 560 is illustrated in FIG. 5 as an integral part of the robot 525, in some implementations, all or aspects of the control system 560 may be implemented in a component that is separate from, but in communication with, robot 525. For example, all or aspects of control system 560 may be implemented on one or more computing devices that are in wired and/or wireless communication with the robot 525, such as computing device 610.

Figure 6:
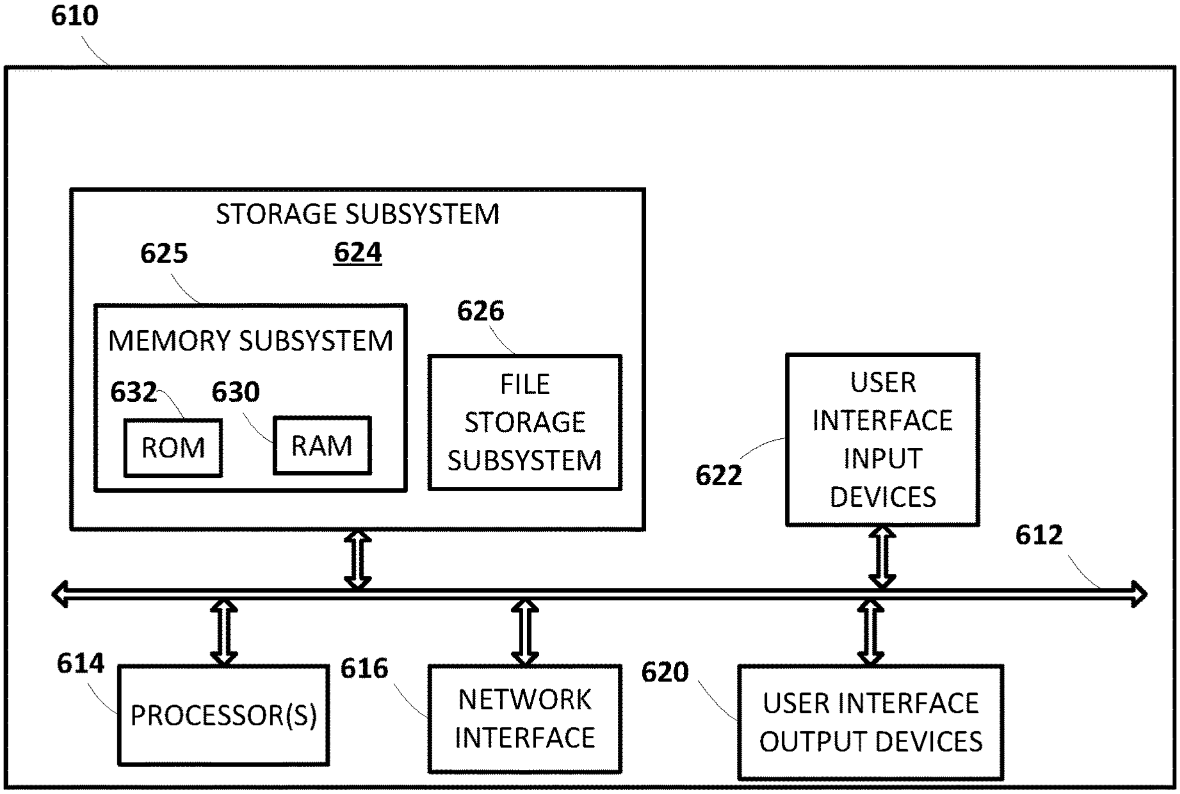
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In some implementations, a method implemented by one or more processors of a mobile robot in an environment is provided. The method includes, during navigation of the mobile robot using a low-level navigation policy that generates low-level robot actions in dependence on a corresponding goal position: identifying a sequence of state data; processing the sequence of state data, using a sequential neural network (NN) model, to generate a sequence of position deltas; generating, based on the sequence of position deltas generated using the sequential NN model, an intermediate target position; and in response to generating the intermediate target position: causing a low-level navigation policy to supplant a current goal position, being used by the low-level navigation policy as a corresponding goal position, with the intermediate target position. The sequence of state data can include a sequence of color images and a sequence of normalized position data instances. The sequence of color images can each include one or more color channels and are each captured by a camera of the robot. The sequence of color images can include a current color image and one or more previous color images. The sequence of normalized position data instances can each reflect a corresponding position already encountered by the mobile robot during navigation of the mobile robot, and can include a current position data instance and one or more previous position data instances.

These and other implementations of the technology disclosed herein can include one or more of the following features.

In some implementations, at least some of the color images of the sequence of color images collectively capture a human, in the environment, providing a particular gesture and the sequence of position deltas, and the intermediate target position, correspond to the particular gesture. In some versions of those implementations, the sequential machine learning model has been previously trained based on supervised training data instances generated from imitation learning episodes in which a corresponding human operator controlled a corresponding mobile robot in dependence on a corresponding gesture provided by a corresponding human captured by a corresponding camera of the corresponding mobile robot. In some of those versions, a given supervised training data instance, of the supervised training data instances, is generated based on only a segment of one of the imitation learning episodes. The segment consists of an earlier in time portion and a later in time portion that follows the earlier in time portion. The given supervised training data instance can include: (a) training instance input that includes: an imitation sequence of color images, captured by a corresponding camera of the corresponding mobile robot during the earlier in time portion of the segment, and an imitation earlier sequence of normalized position data instances that each reflect a corresponding earlier imitation position encountered by the corresponding mobile robot during the earlier in time portion of the segment; and (b) training instance output that includes: an imitation later sequence of normalized position data instances that each reflect a corresponding later imitation position encountered by the corresponding mobile robot during the later in time portion of the segment.

In some implementations, the low-level navigation policy generates low-level robot actions further in dependence on a corresponding goal orientation for the corresponding goal position. In some of those implementations, the method further includes: generating, based on at least some of the sequence of position deltas, an intermediate target orientation for the intermediate target position; and causing the low-level navigation policy to supplant a current goal orientation, being used by the low-level navigation policy as the corresponding goal orientation for the current goal position, with the intermediate target orientation. In some of those implementations, generating the intermediate target orientation includes generating the intermediate target orientation based on a trajectory of the sequence of position deltas.

In some implementations, the low-level navigation policy is a model predictive control (MPC) policy.

In some implementations, the low-level navigation policy generates the low-level robot actions independent of any color images and independent of any data derived from any color images.

In some implementations, the low-level navigation policy generates the low-level robot actions further in dependence on corresponding occupancy maps each reflecting, for a corresponding area of the environment, occupied and/or unoccupied spaces of the corresponding area. In some versions of those implementations, each of the corresponding occupancy maps, of the sequence, is a corresponding two-dimensional project of a point cloud generated by a light detection and ranging (LiDAR) scanner of the mobile robot. In some additional and/or alternative versions of those implementations, the sequence of state data further includes: a sequence of the corresponding occupancy maps, including a current occupancy map and one or more previous occupancy maps previously utilized by the low-level navigation policy during the navigation of the mobile robot.

In some implementations, the corresponding normalized positions are each generated based on a difference between: a corresponding non-normalized position already encountered by the mobile robot at a corresponding time, and an overall goal position for the navigation.

In some implementations, processing the sequence of state data, using the sequential NN model, to generate the sequence of position deltas, includes: processing the sequence of color images, using an image processing tower of the sequential NN model, to generate a sequence of color image embeddings; processing the sequence of normalized position data instances, using a position processing tower of the sequential NN model, to generate a sequence of position data vectors; and processing a sequence of fusions, using fusion layers of the sequential NN model, toe generate the sequence of position deltas, each of the sequences of fusions including a corresponding one of the color image embeddings and a corresponding one of the position data vectors. In some versions of those implementations, the sequence of color image embeddings are each a corresponding lower-dimensional encoding of a corresponding one of the color images of the sequence of color images, and the sequence of position data vectors are each a corresponding higher-dimensional projection of a corresponding one of the normalized position data instances of the sequence of normalized position data instances. In some of those versions, the sequence of color image embeddings are each of a given dimension and wherein the sequence of position data vectors are also each of the given dimension.

In some implementations, the low-level robot actions are torque commands.

In some implementations, generating, based on the sequence of position deltas generated using the sequential NN model, the intermediate target position, includes generating the intermediate target position based on a sum of the sequence of position deltas.

In some implementations, generating the intermediate target position based on the sum of the sequence of position deltas includes generating the intermediate target position as an overall sum of: the sum of the sequence of position deltas, and the current position data instance.

In some implementations, a method implemented by one or more processors of a mobile robot during navigation of the mobile robot in an environment is provided. The method includes, at each of a plurality of low-level iterations: processing, using a low-level navigation policy, a corresponding occupancy map and a corresponding goal position, to generate corresponding low-level robot actions; and providing the corresponding low-level robot actions to actuators of the mobile robot. The method further includes, at each of a plurality of high-level iterations: identifying a corresponding sequence of state data; processing the corresponding sequence of state data, using a neural network (NN) model, to generate a corresponding sequence of position deltas; generating, based on the corresponding sequence of position deltas generated using the sequential NN model, a corresponding intermediate target position; and causing the low-level navigation policy to, in at least a corresponding next of the low-level iterations, utilize the corresponding intermediate target position as the corresponding goal position.

These and other implementations of the technology disclosed herein can include one or more of the following features.

In some implementations, the corresponding sequence of state data includes a corresponding sequence of color images that are each captured by a camera of the robot. For example, the sequence of color images can include a current color image and one or more previous color images.

In some implementations, the low-level iterations are performed at a low-level frequency that is more frequent than a high-level frequency at which the high-level iterations are performed. In some of those implementations, the low-level frequency is at least twice as frequent as the high-level frequency. In some of those implementations, the low-level frequency is at least five times as frequent as the high-level frequency.

In some implementations, the corresponding occupancy maps are generated independent of the corresponding sequences of color images.

In some implementations, at least some of the color images of the corresponding sequence of color images, of a given high-level iteration of the high-level iterations, collectively capture a human, in the environment, providing a particular gesture and the corresponding sequence of position deltas, and the corresponding intermediate target position, generated in the given high-level iteration, correspond to the particular gesture. In some of those implementations, the machine learning model has been previously trained based on supervised training data instances generated from imitation learning episodes in which a corresponding human operator controlled a corresponding mobile robot in dependence on a corresponding gesture provided by a corresponding human captured by a corresponding camera of the corresponding mobile robot.

In some implementations, processing, using the low-level navigation policy, to generate the corresponding low-level robot actions further includes processing a corresponding goal orientation along with the corresponding occupancy map and the corresponding goal position. In some versions of those implementations, the method further includes, at each of the high-level iterations: generating, based on the corresponding sequence of position deltas generated using the NN model, a corresponding intermediate target orientation; and causing the low-level navigation policy to, in at least the corresponding next of the low-level iterations, utilize the corresponding intermediate target orientation as the corresponding goal orientation. In some of those versions, generating the corresponding intermediate target orientation includes generating the intermediate target orientation based on a corresponding trajectory of the corresponding sequence of position deltas.

In some implementations, a method implemented by one or more processors is provided and includes, during control of an autonomous agent using a low-level control policy that generates low-level actions in dependence on a corresponding goal state: identifying a sequence of state data; processing the sequence of state data, using a sequential neural network (NN) model, to generate a sequence of state deltas; generating, based on the sequence of state deltas generated using the sequential NN model, an intermediate target state; and in response to generating the intermediate target state: causing a low-level navigation policy to supplant a current goal state, being used by the low-level control policy as a corresponding goal state, with the intermediate target state. The sequence of state data can include a sequence of color images and a sequence of normalized state data instances. The sequence of color images can each include one or more color channels and are each captured by a camera of the robot. The sequence of color images can include a current color image and one or more previous color images. The sequence of normalized state data instances can each reflect a corresponding state already encountered by the autonomous agent during control of the autonomous agent, and can include a current state data instance and one or more previous state data instances. The autonomous agent can be, for example, a mobile robot or an autonomous agent that controls one or more computer applications through interaction (direct or via an API0 with the application(s).

In some implementations, a method implemented by one or more processors is provided and includes, at each of a plurality of low-level iterations: processing, using a low-level control policy, a corresponding state map and a corresponding goal state, to generate corresponding low-level actions; and providing the corresponding low-level actions to the autonomous agent. The method further includes, at each of a plurality of high-level iterations: identifying a corresponding sequence of state data; processing the corresponding sequence of state data, using a neural network (NN) model, to generate a corresponding sequence of state deltas; generating, based on the corresponding sequence of state deltas generated using the sequential NN model, a corresponding intermediate target state; and causing the low-level navigation policy to, in at least a corresponding next of the low-level iterations, utilize the corresponding intermediate target state as the corresponding goal position. The autonomous agent can be, for example, a mobile robot or an autonomous agent that controls one or more computer applications through interaction (direct or via an API0 with the application(s).

What is claimed is:

1. A method implemented by one or more processors of a mobile robot in an environment, the method comprising:

during navigation of the mobile robot using a low-level navigation policy that generates low-level robot actions in dependence on a corresponding goal position:

identifying a sequence of state data, the sequence of state data comprising:

a sequence of color images that each include one or more color channels and that are each captured by a camera of the robot, wherein the sequence of color images includes a current color image and one or more previous color images, and wherein at least some of the color images of the sequence of color images collectively capture a human, in the environment, providing a particular gesture, a sequence of normalized position data instances that each reflects a corresponding position already encountered by the mobile robot during navigation of the mobile robot, wherein the sequence of normalized position data instances includes a current position data instance and one or more previous position data instances;

processing the sequence of state data, using a sequential neural network (NN) model, to generate a sequence of position deltas that is responsive to the particular gesture;

generating, based on the sequence of position deltas generated using the sequential NN model, an intermediate target position that is responsive to the particular gesture; and in response to generating the intermediate target position:

causing the low-level navigation policy to supplant a current goal position, being used by the low-level navigation policy as the corresponding goal position, with the intermediate target position that is responsive to the particular gesture.

2. The method of claim 1, wherein the sequential machine learning model has been previously trained based on supervised training data instances generated from imitation learning episodes in which a corresponding human operator controlled a corresponding mobile robot in dependence on a corresponding gesture provided by a corresponding human captured by a corresponding camera of the corresponding mobile robot.

3. The method of claim 2, wherein a given supervised training data instance, of the supervised training data instances, is generated based on only a segment of one of the imitation learning episodes, wherein the segment consists of an earlier in time portion and a later in time portion that follows the earlier in time portion and wherein the given supervised training data instance comprises:

training instance input that includes:

an imitation sequence of color images, captured by a corresponding camera of the corresponding mobile robot during the earlier in time portion of the segment, and an imitation earlier sequence of normalized position data instances that each reflect a corresponding earlier imitation position encountered by the corresponding mobile robot during the earlier in time portion of the segment; and training instance output that includes:

an imitation later sequence of normalized position data instances that each reflect a corresponding later imitation position encountered by the corresponding mobile robot during the later in time portion of the segment.

4. The method of claim 1, wherein the low-level navigation policy generates low-level robot actions further in dependence on a corresponding goal orientation for the corresponding goal position and further comprising:

generating, based on at least some of the sequence of position deltas, an intermediate target orientation for the intermediate target position; and causing the low-level navigation policy to supplant a current goal orientation, being used by the low-level navigation policy as the corresponding goal orientation for the current goal position, with the intermediate target orientation.

5. The method of claim 4, wherein generating the intermediate target orientation comprises generating the intermediate target orientation based on a trajectory of the sequence of position deltas.

6. The method of claim 1, wherein the low-level navigation policy is a model predictive control (MPC) policy.

7. The method of claim 1, wherein the low-level navigation policy generates the low-level robot actions independent of any color images and independent of any data derived from any color images.

8. The method of claim 1, wherein the low-level navigation policy generates the low-level robot actions further in dependence on corresponding occupancy maps each reflecting, for a corresponding area of the environment, occupied and/or unoccupied spaces of the corresponding area.

9. The method of claim 8, wherein each of the corresponding occupancy maps, of the sequence, is a corresponding two-dimensional project of a point cloud generated by a light detection and ranging (LiDAR) scanner of the mobile robot.

10. The method of claim 8, wherein the sequence of state data further comprises:

a sequence of the corresponding occupancy maps, including a current occupancy map and one or more previous occupancy maps previously utilized by the low-level navigation policy during the navigation of the mobile robot.

11. The method of claim 1, wherein the corresponding normalized positions are each generated based on a difference between:

a corresponding non-normalized position already encountered by the mobile robot at a corresponding time, and an overall goal position for the navigation.

12. The method of claim 1, wherein processing the sequence of state data, using the sequential NN model, to generate the sequence of position deltas, comprises:

processing the sequence of color images, using an image processing tower of the sequential NN model, to generate a sequence of color image embeddings;

processing the sequence of normalized position data instances, using a position processing tower of the sequential NN model, to generate a sequence of position data vectors;

processing a sequence of fusions, using fusion layers of the sequential NN model, to generate the sequence of position deltas, each of the sequences of fusions comprising a corresponding one of the color image embeddings and a corresponding one of the position data vectors.

13. The method of claim 12, wherein the sequence of color image embeddings are each a corresponding lower-dimensional encoding of a corresponding one of the color images of the sequence of color images and wherein the sequence of position data vectors are each a corresponding higher-dimensional projection of a corresponding one of the normalized position data instances of the sequence of normalized position data instances.

14. The method of claim 13, wherein the sequence of color image embeddings are each of a given dimension and wherein the sequence of position data vectors are also each of the given dimension.

15. The method of claim 1, wherein the low-level robot actions are torque commands.

16. The method of claim 1, wherein generating, based on the sequence of position deltas generated using the sequential NN model, the intermediate target position, comprises:

generating the intermediate target position based on a sum of the sequence of position deltas.

17. The method of claim 1, wherein generating the intermediate target position based on the sum of the sequence of position deltas comprises:

generating the intermediate target position as an overall sum of:

the sum of the sequence of position deltas, and the current position data instance.

18. A method implemented by one or more processors of a mobile robot during navigation of the mobile robot in an environment, the method comprising:

at each of a plurality of low-level iterations:

processing, using a low-level navigation policy, a corresponding occupancy map and a corresponding goal position, to generate corresponding low-level robot actions, and providing the corresponding low-level robot actions to actuators of the mobile robot;

at each of a plurality of high-level iterations:

identifying a corresponding sequence of state data, the corresponding sequence of state data comprising:

a corresponding sequence of color images that are each captured by a camera of the robot, wherein the sequence of color images includes a current color image and one or more previous color images, and wherein at least some of the color images of the sequence of color images collectively capture a human, in the environment, providing a particular gesture;

processing the corresponding sequence of state data, using a neural network (NN) model, to generate a corresponding sequence of position deltas that is responsive to the particular gesture;

generating, based on the corresponding sequence of position deltas generated using the sequential NN model, a corresponding intermediate target position that is responsive to the particular gesture; and causing the low-level navigation policy to, in at least a corresponding next of the low-level iterations, utilize the corresponding intermediate target position, that is responsive to the particular gesture, as the corresponding goal position.

19. The method of claim 18, wherein the low-level iterations are performed at a low-level frequency that is more frequent than a high-level frequency at which the high-level iterations are performed.

* * * * *